US005587626A

United States Patent [19]

Parham et al.

[11] Patent Number: 5,587,626

[45] Date of Patent: Dec. 24, 1996

[54] PATTERNED OPTICAL INTERFERENCE COATINGS FOR ONLY A PORTION OF A HIGH INTENSITY LAMP ENVELOPE

[75] Inventors: Thomas G. Parham, Gates Mills; Frederick W. Dynys, Chagrin Falls; Carl V. Gunter, Twinsburg; John M. Davenport, Lyndhurst; Thomas M. Golz, Willoughby Hills; Rolf S. Bergman, Cleveland Heights; Frederic F. Ahlgren, Euclid; Gary R. Allen, Chesterland; Mark E. Duffy, Shaker Heights; Richard L. Hansler, Pepper Pike, all of Ohio

[73] Assignee: General Electric Company, Schenectady, N.Y.

[21] Appl. No.: 579,447

[22] Filed: Dec. 27, 1995

Related U.S. Application Data

[63] Continuation of Ser. No. 165,447, Dec. 10, 1993, abandoned.

[51] Int. Cl.[6] .............................. H01J 17/16; H01J 61/30; G02B 1/10; F21M 3/14

[52] U.S. Cl. .......................... 313/634; 313/635; 359/584; 362/255

[58] Field of Search .................................... 313/112, 113, 313/634, 635; 362/255, 256; 359/359, 584, 589

[56] References Cited

U.S. PATENT DOCUMENTS

| | | | |
|---|---|---|---|
| 1,262,395 | 4/1918 | Schickerling | 313/113 |
| 1,998,967 | 3/1928 | Raynolds | 313/113 |
| 2,158,561 | 5/1939 | Biggs | 313/113 |
| 3,662,203 | 5/1972 | Kuhl et al. | 313/25 |
| 4,020,377 | 4/1977 | Popp et al. | 313/112 |
| 4,171,498 | 10/1979 | Fromm et al. | 313/641 |
| 4,345,178 | 8/1982 | Pappas et al. | 313/113 |
| 4,463,277 | 7/1984 | De Caro | 313/113 |
| 4,949,005 | 8/1990 | Parham et al. | 313/112 |
| 5,041,755 | 8/1991 | Pchelin et al. | 313/113 |
| 5,109,181 | 4/1992 | Fischer et al. | 313/639 |
| 5,138,219 | 8/1992 | Krisl et al. | 313/112 |
| 5,143,445 | 9/1992 | Bateman et al. | 362/255 |
| 5,422,534 | 6/1995 | Dynys et al. | 313/112 |

FOREIGN PATENT DOCUMENTS

| | | | |
|---|---|---|---|
| 507533 | 10/1992 | European Pat. Off. | 313/639 |
| 63-105456 | 5/1988 | Japan | 313/638 |
| WO9002964 | 3/1990 | WIPO | 359/359 |

*Primary Examiner*—Anita Pellman Gross
*Assistant Examiner*—Walter J. Malinowski
*Attorney, Agent, or Firm*—Stanley C. Corwin; George E. Hawranko

[57] ABSTRACT

An interference filter or coating is provided in a predetermined pattern on a lamp envelope. The coating is comprised of alternating layers of high and low index of refraction materials applied to a vitreous outer surface of a lamp envelope. The coating may be geometrically symmetric or asymmetric, continuous or discontinuous with respect to the coating itself or the envelope to which it has been applied. The envelope can be masked prior to deposition of the coating so that removal of the mask leaves the filter in the desired pattern. The preferred process for forming the coating includes forming a boric oxide mask on a portion of the envelope, applying the coating over the mask and removing the coating from masked areas of the envelope by dissolving the mask in an aqueous solution.

24 Claims, 13 Drawing Sheets

Fig. 2
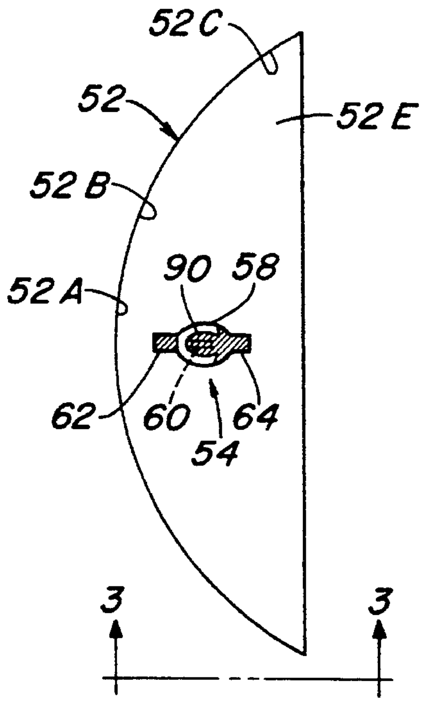
Fig. 3
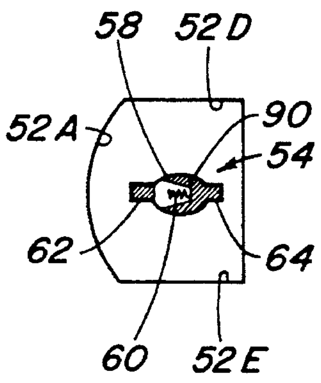
Fig. 4
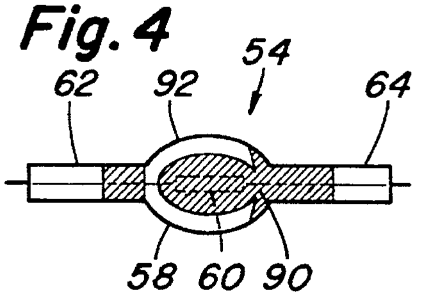
Fig. 5
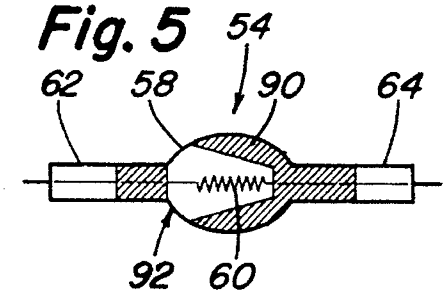
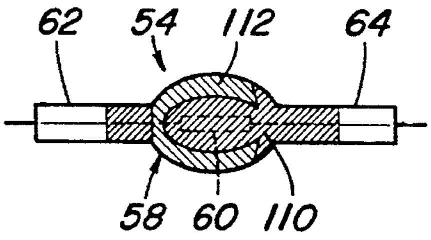
Fig. 6
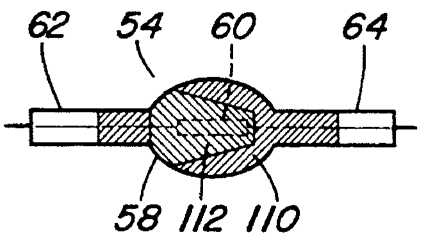
Fig. 7

Fig. 8
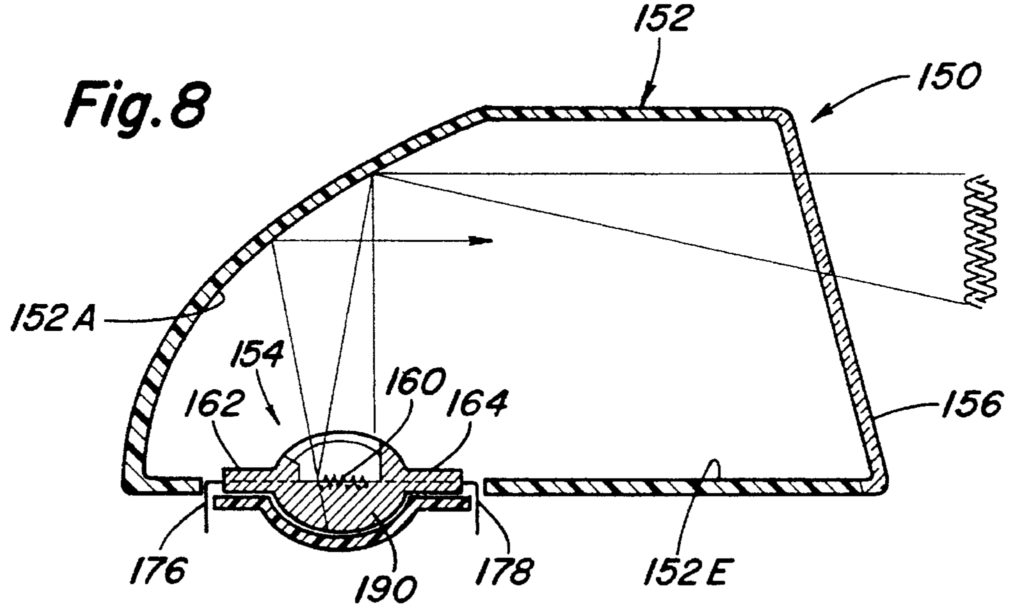
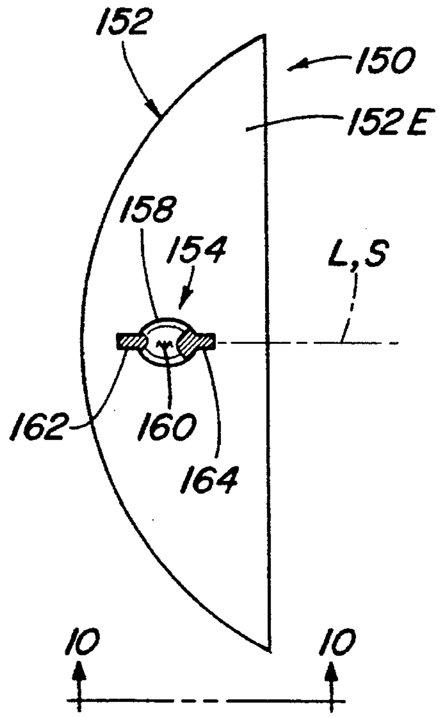
Fig. 9
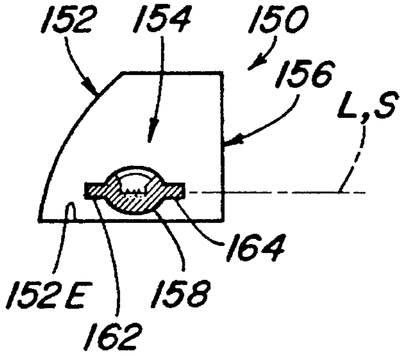
Fig. 10

Fig. 11
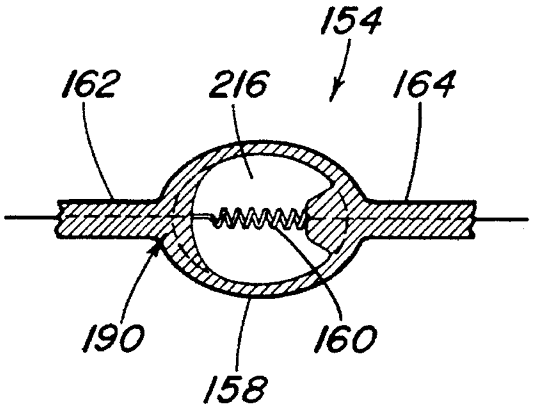
Fig. 12
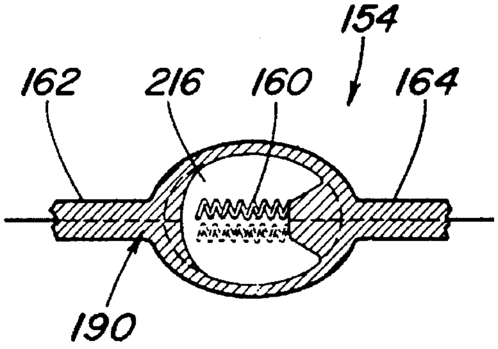
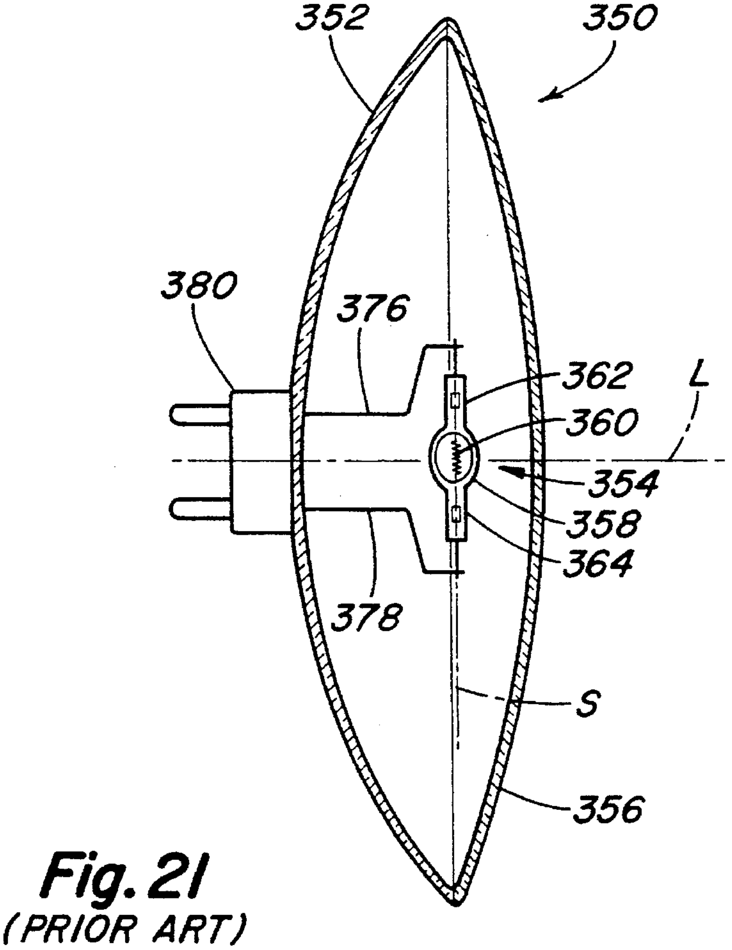
Fig. 21
(PRIOR ART)

Fig. 13
(PRIOR ART)
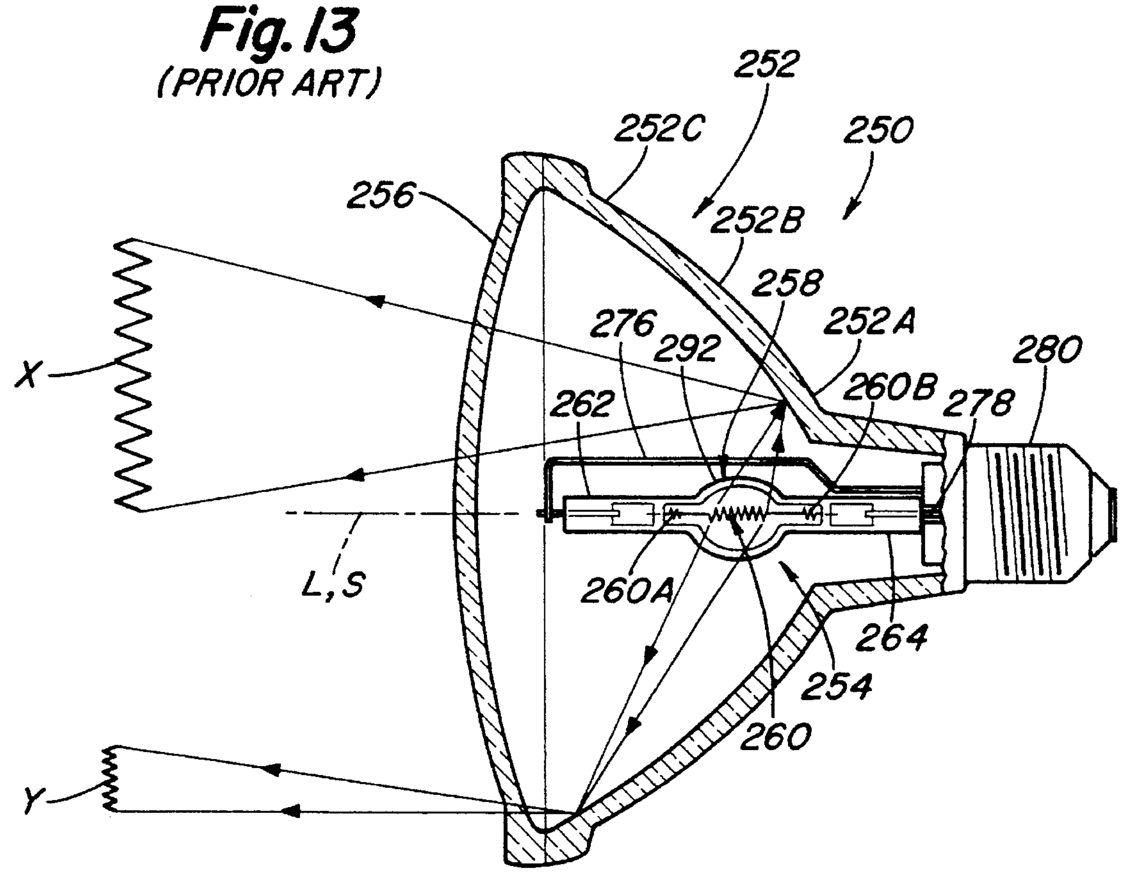
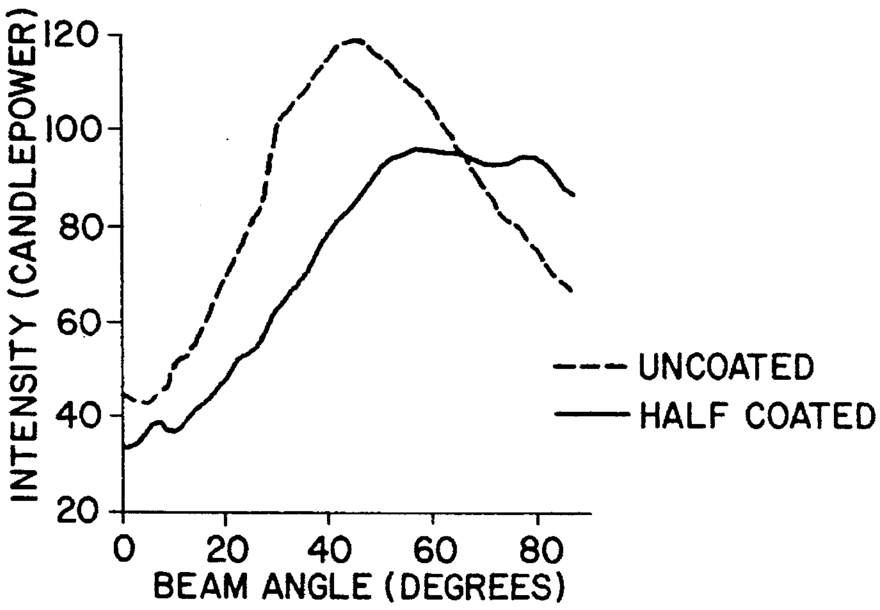
Fig. 18

Fig. 19
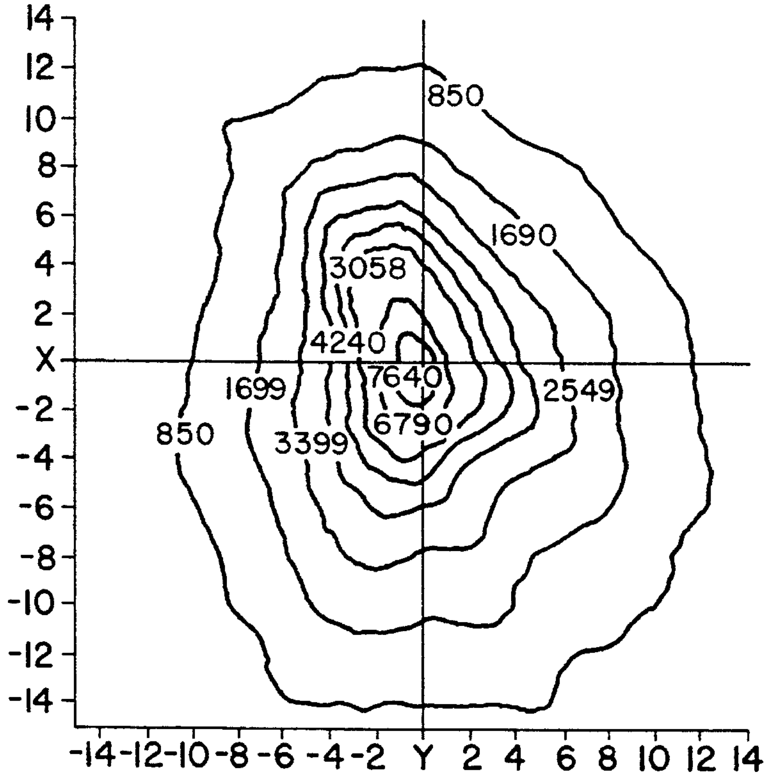
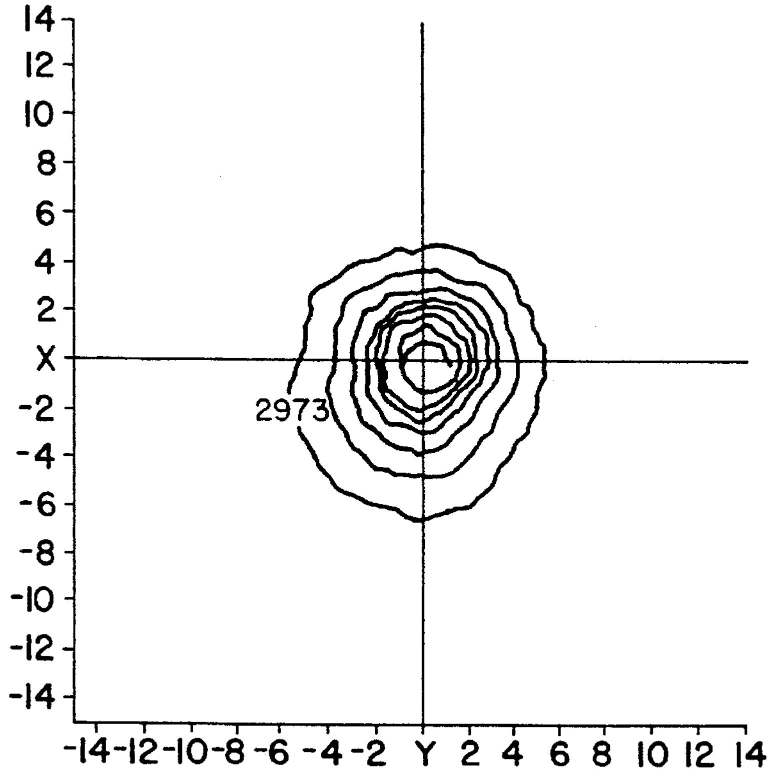
Fig. 20

CANDLEPOWER DISTRIBUTION WITH UNCOATED TUBE

CANDLEPOWER DISTRIBUTION WITH HALF COATED TUBE

Fig. 33
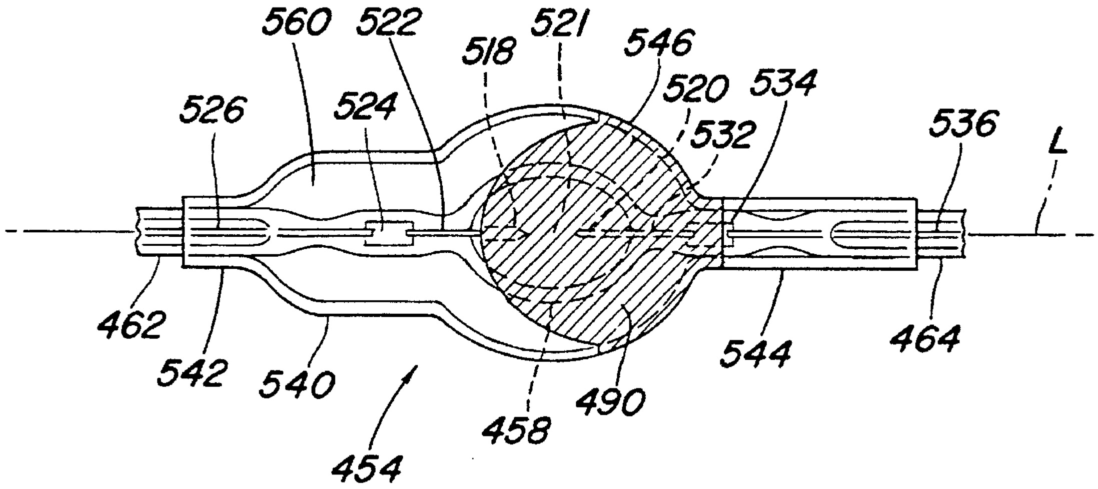
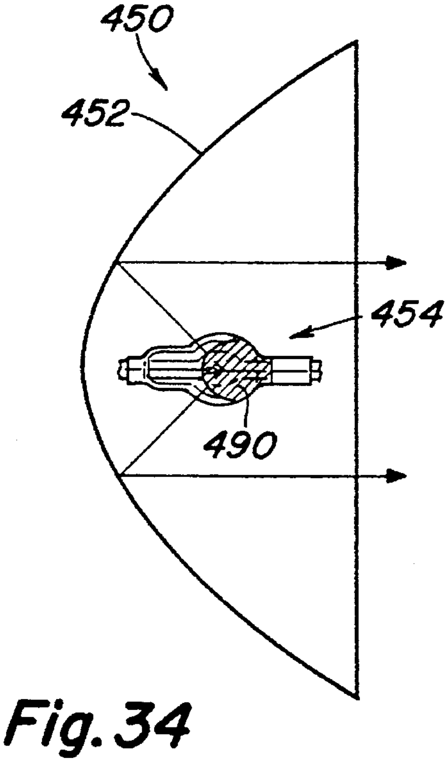
Fig. 34
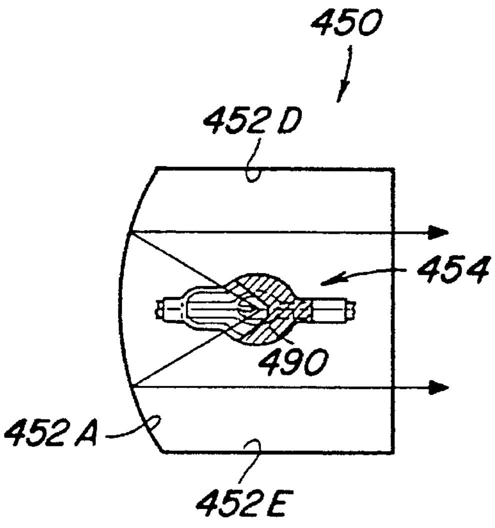
Fig. 35

PATTERNED OPTICAL INTERFERENCE COATINGS FOR ONLY A PORTION OF A HIGH INTENSITY LAMP ENVELOPE

This is a continuation of application Ser. No. 08/165,447 filed on Dec. 10, 1993 now abandoned.

BACKGROUND OF THE INVENTION

This invention relates to patterned optical interference filters, a preferred method for producing them and the use of such filters with lamps. More particularly, this invention relates to optical interference filters of a predetermined pattern or geometry, continuous or discontinuous, symmetric or asymmetric and their use with lamps.

Multilayer optical interference filters and their use with electric lamps are well known to those skilled in the art. A commercially available, high efficiency lamp including an optical interference filter that has achieved considerable commercial success is the Halogen-IR™ lamp available from General Electric Company. Briefly, this lamp includes a miniature, double-ended, linear light source such as a halogen-incandescent light source, mounted inside a parabolic reflector. The light source is fabricated from a fused quartz envelope and has a multilayer optical interference filter disposed over the entire external surface of the envelope. The filter is transparent to visible light radiation but reflects infrared radiation emitted by the light source back to the light source. Each time the infrared radiation is reflected back to the light source, at least a portion is converted to visible light radiation which is then emitted by the lamp.

The optical interference filter is made of alternating layers of refractory metal oxides having high and low indexes of refraction. Refractory metal oxides are used in these types of applications because they are able to withstand the relatively high temperatures ranging from between about 400°–900° C. on the outer surface of the high temperature glass or fused quartz envelope that encloses a filament or arc source during operation. Such oxides include, for example, titania, hafnia, tantala, and niobia for the high index of refraction material and silica or magnesium fluoride for the low index of refraction material.

Multilayer optical interference filters are useful for hot mirrors and as cold mirrors on reflectors, and also as coatings or films on reflectors, lamps and lamp lenses to alter the emitted or projected color as desired. It is desirable to be able to apply such optical interference filters to the surface of the filament or arc chamber envelope of a lamp or onto the surface of an outer lamp envelope, reflector or lens in a predetermined asymmetric or symmetric pattern to selectively reflect and transmit various portions of the electromagnetic spectrum in a predetermined direction and pattern.

Relatively large, conventional incandescent lamps having a metallic coating symmetrically disposed on the glass envelope for reflecting the emitted light in a desired direction or pattern are known in the prior art. The reflector materials disclosed in known arrangements, though, are deemed deficient for a number of reasons. For example, known reflector arrangements are not capable of withstanding high temperatures in excess of 400° C. or are only applied in geometrically symmetric and continuous configurations. Many applications require a light source (e.g. halogen or arc tube) that has a power density above four watts per square centimeter (4 watts/$cm^2$). If a reflective coating was disposed on an external surface of the light source, then known coatings would be inadequate since the coatings would not withstand the high temperatures associated with such a power density range. Also many known coatings will reflect the heat, but with optical interference coatings selectivity with regard to transmitted light, e.g. wavelength, color, heat emission, or U.V. control of the light are exemplary of a few variables that can be controlled.

Prior arrangements sought to maximize the light emitted in a beam by spatially enveloping as much of the light source as possible with a reflector. In order to concentrate the beam in small angle compact structures, and simultaneously provide low magnification of the projected image, reflectors had to be quite large. In recent years, though, there has been a growing demand for more compact directional lighting systems for use in various applications such as automotive and display lighting.

One way to address the concern with reflector size is to use a low profile, truncated parabolic reflector. Headlamps are one common commercial product where truncated parabolic reflectors are used in that manner. Unfortunately, a portion of the light emitted by the source does not reach the active portion of the reflector, i.e., the parabolic surface portion. With a linear light source aligned with a central axis of the parabolic reflector between upper and lower truncating reflecting surfaces, light emanating upwardly or downwardly from the light source and directly reaching the upper and lower truncating surfaces is wasted. In contrast, light emanating rearwardly so as to reach the parabolic reflecting surface is controllably directed to achieve a desired beam pattern. Light emanating directly forward from the light source, and bypassing all reflecting surfaces, lacks the directional control provided by the parabolic reflecting surface and results in glare to an observer. Truncation results in collection inefficiency and decreased beam candlepower. To counteract this, it is often necessary to increase the source power.

The Halogen-IR™ lamp developed by General Electric Company and mentioned above overcomes some of the drawbacks of the reduced collection efficiency of compact, truncated reflectors. The provision of an infrared (IR) light reflective coating applied on and covering the entire outer surface of the envelope increases efficacy of the filament tube source.

While the IR reflective coating is more desirable than prior arrangements, it still suffers the same loss in collection efficiency and beam candlepower as the reflector lamp is made more compact. The truncated automotive headlamp arrangement described above is but one example. Other, and a wide variety of, light systems can be improved.

Accordingly, a need exists for a high intensity type of incandescent, arc discharge, or electrodeless lamp having a multilayer optical interference filter disposed on the outer surface of the light source envelope in a predetermined pattern for selectively reflecting and transmitting desired portions of the electromagnetic spectrum emitted by the light source in a predetermined direction and pattern. It would be desirable to provide a partially coated light source having a compact means for causing a greater extent of the light generated by the source to be projected in predetermined orientations and patterns, for example, onto a reflecting surface of a lighting system.

The present invention contemplates a new and improved process for coating a lamp, a coated lamp and lighting systems employing the coated lamp that overcome all of the above referenced problems and others while simultaneously satisfying various objectives in an economical manner.

SUMMARY OF THE INVENTION

The present invention relates to a patterned optical interference filter, methods for producing such filters, and the use of such filters with electric lamps and lighting systems.

According to the invention, a light source includes an envelope and means for generating light from within a sealed chamber of the high temperature envelope such that the average power density transmitted through the envelope is at least four watts per centimeter squared. The envelope includes an optical interference coating on only a portion of an external surface of the envelope for reflecting light from the light generating means in a direction that enhances the amount of light transmitted through an uncoated portion of the envelope.

According to yet another aspect of the invention, the optical interference coating can be continuous, discontinuous, symmetrically or asymmetrically disposed on the external surface of the envelope.

According to the invention, a process of forming an optical interference filter on an envelope includes forming a boric oxide mask on a portion of the envelope on which the optical interference filter is not desired, applying the optical interference filter over the mask, and dissolving the mask in a solvent.

According to another aspect of the process, the boric oxide mask forming step includes applying a boric oxide precursor and converting the precursor to boric oxide.

A primary advantage of the invention is the ability to selectively coat a lamp envelope for increasing the light output or source brightness in preselected directions that do not include the coating.

Another advantage of the invention is realized by the applicability of the process and coating to various types of lamps such as incandescent, arc discharge, and electrodeless lamps.

Yet another advantage of the invention resides in a tighter beam pattern having increased candlepower.

Still other advantages and benefits of the subject invention will become apparent to those skilled in the art upon a reading and understanding of the subject invention.

BRIEF DESCRIPTION OF THE DRAWINGS

The invention may take physical form in certain parts and arrangements of parts, preferred embodiments, and a method of forming same, of which will be described in detail in this specification and illustrated in the accompanying drawings which form a part hereof, and wherein:

FIG. 2 is a diagrammatic top plan view of a directional light system similar to that of FIG. 1, but having a light reflective optical interference coating applied on a first portion of an exterior surface of the transparent envelope portion of the light source in a clamshell-shaped pattern;

FIG. 3 is a diagrammatic side elevational view of the directional light system as seen along line 3—3 of FIG. 2;

FIG. 4 is an enlarged diagrammatic top view of the light source of FIG. 2, being shown by itself;

FIG. 5 is an enlarged diagrammatic side elevational view of the light source of FIG. 2, being shown by itself;

FIG. 6 is a top plan view of the light source similar to that of FIG. 4, but with the light source having visible and IR light reflective optical interference coatings applied on a first portion of the exterior surface of the transparent envelope thereof in a clamshell-shaped pattern, the IR light reflective coating being also applied on a second portion of the exterior surface of the transparent envelope such that the IR reflective coating covers the entire exterior surface of a bulbous portion of the transparent envelope;

FIG. 7 is a diagrammatic side elevational view of the light source of FIG. 6;

FIG. 8 is an enlarged side elevational view, with parts sectioned, of a directional light system employing an asymmetrical reflector and a light source envelope having a light reflective coating in accordance with the features of the present invention;

FIG. 9 is a diagrammatic top plan view of the directional light system of FIG. 8;

FIG. 10 is a diagrammatic side elevational view of the directional light system as seen along line 10—10 of FIG. 9;

FIG. 11 is an enlarged diagrammatic top plan view of the light source of the directional light system of FIG. 8, with the active linear light generating element extending in substantially coaxial relation to the longitudinal axis of the light source;

FIG. 12 is an enlarged diagrammatic top plan view of the light source similar to that of FIG. 11, but with the active linear light generating element extending in an axially offset relation to the longitudinal axis of the light source;

FIG. 13 is a side elevational view, partly in section, of a prior art directional light system comprising a parabolic-shaped reflector and a light source axially aligned therewith, the light source having a transparent envelope and an active linear light generating element disposed inside of the envelope;

FIG. 18 is a graph plotting the intensity or candlepower of the light beam produced by coated and uncoated envelopes versus the angle of the beam relative to the longitudinal axis of the reflector;

FIG. 19 is a chart of the candlepower distribution around a light source having the uncoated transparent envelope of FIG. 13;

FIG. 20 is a chart of the candlepower distribution around a light source having the coated transparent envelope of FIG. 14;

FIG. 21 is a side elevational view, partly vertically sectioned, of a prior art directional light system comprising a parabolic-shaped reflector and a light source aligned transversely therewith, the light source having a transparent envelope and an active linear light generating element extending substantially coaxially with the transparent envelope;

FIGS. 32 and 33 are simplified side and top plan views, respectively, of another light source selectively covered with the mentioned coating, which can be used in the reflector lamp of FIG. 28;

FIGS. 34 and 35 are diagrammatic top and side plan views, respectively, of the reflector lamp of FIG. 28 for showing light rays emanating from portions of the shrouded light source of FIGS. 32 and 33 that lack the mentioned coating.

DETAILED DESCRIPTION OF THE DRAWINGS

Figure 1:
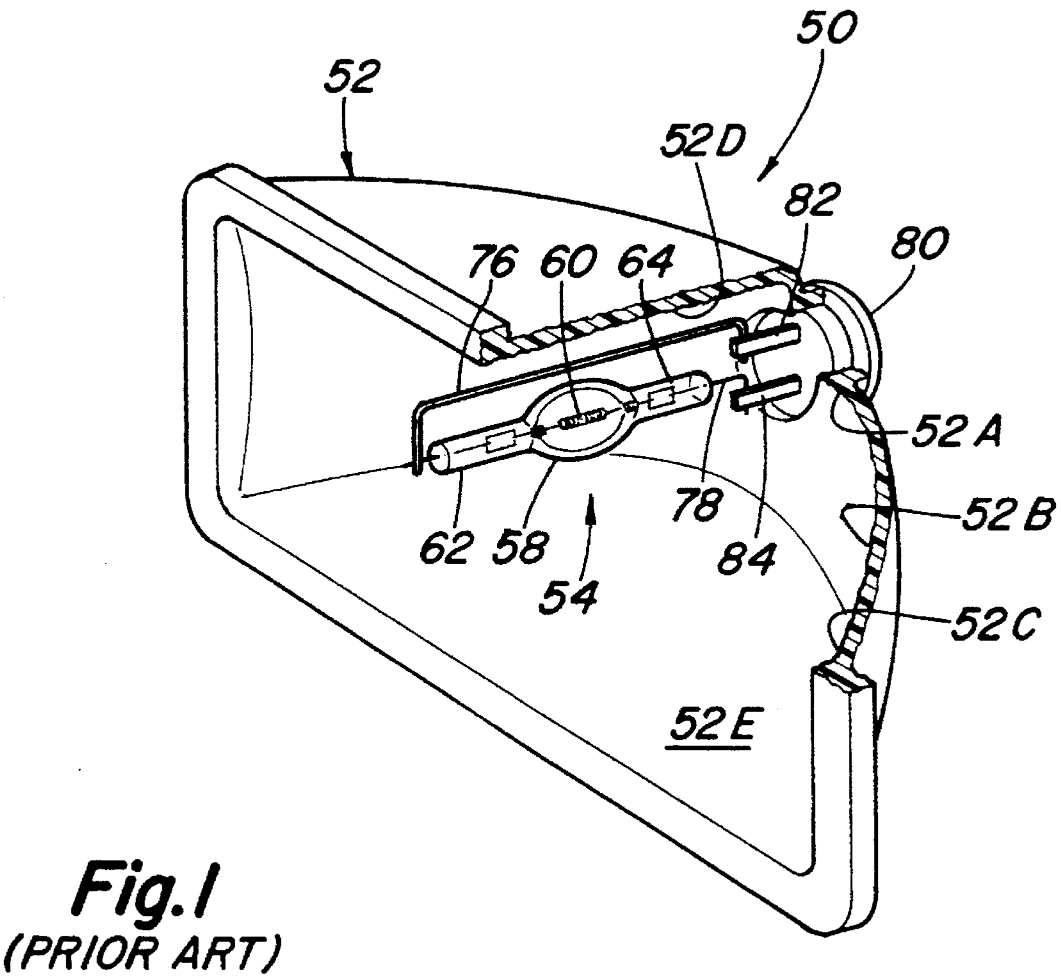
Fig.1 (PRIOR ART)
FIG. 1 is a front perspective view partially cut-away of a prior art directional light system comprising a truncated parabolic-shaped reflector and a light source axially aligned therewith, the light source having an active linear light generating portion and a transparent envelope portion.

Referring now to the drawings, and particularly to FIG. 1, there is illustrated a prior art directional light system 50. The light system includes a reflector 52 and a light source 54 extending within and in coaxial alignment with the reflector. The reflector 52 has a substantially truncated parabolic shape. More particularly, the reflector includes a primary reflecting surface comprising a base portion 52A, a midsection 52B, a rim portion 52C, and first and second non-reflective surfaces 52D and 52E. As will be understood, the surfaces 52D and 52E may be coated or formed from a reflective material but do not actively contribute to the directional light system.

The light source 54 has a double ended envelope of quartz material. The light source further has a central elliptical or bulbous portion 58 and a linear light-generating filament 60 therein. The envelope has sealed first and second end portions 62, 64 extending coaxially with one another in opposite directions from the bulbous portion. The linear filament 60 is positioned in the bulbous portion of the quartz envelope and supported at opposite ends by the sealed end portions of the envelope. The light source 54 is supported by a pair of upper and lower connector members 76, 78 extending from a potted plug 80 mounted in an opening in the rear end of the reflector 52 by a pair of upper and lower conductor members 82, 84. The conductor members interconnect the connector members 76, 78 with opposite ends of the filament 60.

Referring to FIGS. 2–5, the present invention is an optical interference filter in the form of a visible light reflective coating 90 applied on a first portion of exterior surface 92 of the transparent envelope. The visible light reflective coating 90 is applied in a clamshell-shaped pattern. The clamshell shape is similar to the dumb-bell shape of the corresponding mating sections that make up the outer covering on a baseball or tennis ball. More particularly, the clamshell-shaped coating 90 is a pattern on the exterior surface of the transparent envelope that excludes the surface area of the envelope that is defined by the intersection of all light rays that pass between the active light generating portion of the linear filament 60 and the primary reflective surface 52A, 52B, 52C of the truncated parabolic reflector. The shape of the clamshell pattern is such that the primary reflective surface of the reflector 52 would view the light generating portion of filament 60 and the non-reflective surfaces 52D and 52E would primarily see the coated surface 90.

As best seen in FIGS. 4 and 5, the clamshell pattern coating 90 covers the top-upper, bottom-lower and front-face surface portions of the bulbous portion 58 of the envelope whereas the remaining surface of the envelope defined by the two opposite-side portions and the rear-face portion is uncoated. The clamshell pattern of the coating reflects the heretofore unusable forward-going visible light as well as the heretofore unusable visible light which diverges in opposite directions away from the forward-going light and redirects such light toward the filament 60. Much of this redirected visible light is then scattered off the filament and into the reflector 52. The coating 90 acts as a light shield to eliminate direct forward light glare. Also, it should be understood that the above-described coating pattern is such that the remaining uncoated portion of the exterior surface of the transparent envelope permits the active light generating portion of the filament to be seen at any point on the primary reflective surface of the reflector 52.

Due to the axial alignment maintained between the reflector and the light source, and also due to the substantial mating of the truncated parabolic shape of the primary reflective portion of the reflector with that of the clamshell pattern of the visible light reflective coating 90 on the envelope of the light source 54, the improved directional light system is capable of producing a light beam pattern having improved light collection efficiency and enhanced candlepower while retaining its reduced size. In a representative example, a tantala/silica multilayer visible reflecting coating resulted in a 25% increase in beam lumens relative to uncoated envelopes.

Referring to FIGS. 6 and 7, there is illustrated a modified embodiment incorporating another configuration of an optical interference filter in the form of a combined visible and IR light reflective optical interference coating 110 applied on the first portion of the exterior surface of the transparent envelope in a clamshell-shaped pattern. The second portion or remainder of the exterior surface of the transparent envelope contains only an IR light reflective coating 112. In this manner, the entire exterior surface of the bulbous portion of the transparent envelope is reflective to IR light.

Referring now to FIGS. 8–10, a related directional lighting system 150 incorporating features of the subject invention will be described. In similar fashion, like elements will be referenced by like numerals increased by one hundred (e.g., light system 50 a shown in FIG. 1 will be referenced as light system 150 in FIGS. 8–10) and new elements will be identified by new numerals. The light system includes an asymmetrical reflector 152 having a longitudinal axis L, and a linear light source mounted within the reflector. The light source has a longitudinal axis S extending in coaxial alignment with the longitudinal axis of the reflector 152. A cover lens 156 is secured to the front of the reflector. The reflector has a truncated semi-parabolic shape, an asymmetrical primary reflective portion 152A and a focal point that lies on the axis L.

Preferably, the light source 154 is a double-ended envelope of quartz material that has a bulbous central portion 158 and sealed opposite linear end portions 162, 164. The linear filament 160 is supported at its opposite ends by the sealed opposite end portions of the envelope. The light source 154 is supported above a base 152E of the reflector by a pair of inner and outer connector members 176, 178. The connector members extend upwardly from the base 152E and are connected with the opposite ends of the filament 160.

With continued reference to FIGS. 8–10, and additional reference to FIGS. 11 and 12, this light system uses an optical interference filter in the form of a light reflective coating 190 applied on a first portion of the exterior surface of the transparent envelope. The light reflective coating 190 is applied in a pattern relative to the longitudinal axis of the light source S. More particularly, the pattern of the coating covers the opposite end portions 162, 164 and approximately one-half of the bulbous portion 158 of the envelope. Only an upper aperture or window-like region 216 of the bulbous portion of the envelope remains transparent to light. Light emitted upwardly from the filament through the aperture 216 is reflected and directed by the asymmetrical reflector 152 either straight ahead or inclined downwardly, as seen in FIG. 8, such as toward a road. There is no light directed upwardly above the horizontal plane which extends parallel to the longitudinal parabolic axis L. In prior art symmetrical reflectors such light causes glare to oncoming drivers.

The pattern of the coating 190 reflects back through or past the filament and toward the reflector light which would otherwise be lost and not used in the absence of the coating. This improves control and enhances efficiency of the light beam pattern. Also, it should be understood that the above-described coating pattern is such that the remaining uncoated aperture or window-like region 216 permits the active light generating portion of the filament 160 to be seen at any point on the asymmetrical reflective portion 152A of the reflector. The active light generating portion of the filament 160 extends coaxially with the remainder of the filament and the opposite ends 162, 164 of the envelope with respect to the axis S.

Referring to FIG. 12, there is illustrated another embodiment of the light source 154. The only difference between the light source in FIGS. 10 and 11 and the light source in FIG. 12 is that the active light generating portion of the filament 160 is axially offset parallel to the remainder of the filament and the opposite ends of the envelope with respect to the axis S of the light source. By axially offsetting the filament, much of the light that would normally be intercepted by the filament and was scattered or absorbed, is able to reach the active reflector without a significant increase in apparent source size. This increases the lumen output without significant loss of control.

Due to the axial alignment maintained between the reflector 152 and the light source 154, and also due to the substantial matching of the reflective portion 152A of the semi-parabolic shaped reflector with the pattern of the visible light reflective coating 190, the improved direction light system 150 is capable of producing a light beam pattern having better light collection efficiency and enhanced candlepower even though its reduced size is retained. The light beam pattern is particularly advantageous for use as a low profile headlamp low beam pattern. In a representative example, a tantala/silica multilayer visible reflecting coating was deposited over a portion of an envelope via LPCVD (Low Pressure Chemical Vapor Deposition). With the asymmetrical reflector and visible light reflective coating on the envelope, a 70% increase in useful beam candlepower can be realized relative to comparable symmetric reflector design and without the visible reflective coating on the envelope.

Referring to FIG. 13, a prior art directional light system generally designated 250 is illustrated. For purposes of convenience and consistency, like elements in the prior art arrangement of FIG. 13, and like elements in the embodiments of FIGS. 14–20 employing details of the subject invention, will be referenced by like numerals increased by two hundred (e.g., light system 50 as shown in FIG. 1 will be referenced as light system 250 in this embodiment). Basically, the prior art system 250 includes a reflector 252 and a light source 254 extending within and in substantially coaxial alignment with the reflector 252. A convex lens 256 is secured to the front periphery of the reflector 252. The reflector in FIG. 13 has a substantially truncated parabolic shape and a longitudinal axis L. The light source 254 has a longitudinal axis S and is preferably a double-ended envelope of vitreous material such as quartz. A central portion of the light source has a substantially elliptical shape 258 and a linear light-generating filament 260 disposed inside of the envelope and extending along the longitudinal axis S of the light source. The envelope also has a pair of sealed opposite inner and outer linear end portions 262, 264 (as viewed in FIG. 13) extending coaxially with one another along the axis S in opposite directions from the central portion 258. The linear filament 260 is positioned through the central portion of the quartz envelope and supported at its opposite ends 260A, 260B (as viewed in FIG. 13) by the sealed opposite end portions 262, 264 of the envelope. The light source 254 is supported with its longitudinal axis S in substantially coaxial relationship with the longitudinal axis L of the reflector 252 by a pair of upper and lower conductive mounting members 276, 278 secured to and extending from a potted plug 280 disposed in an opening in the end of the reflector.

Figure 14:
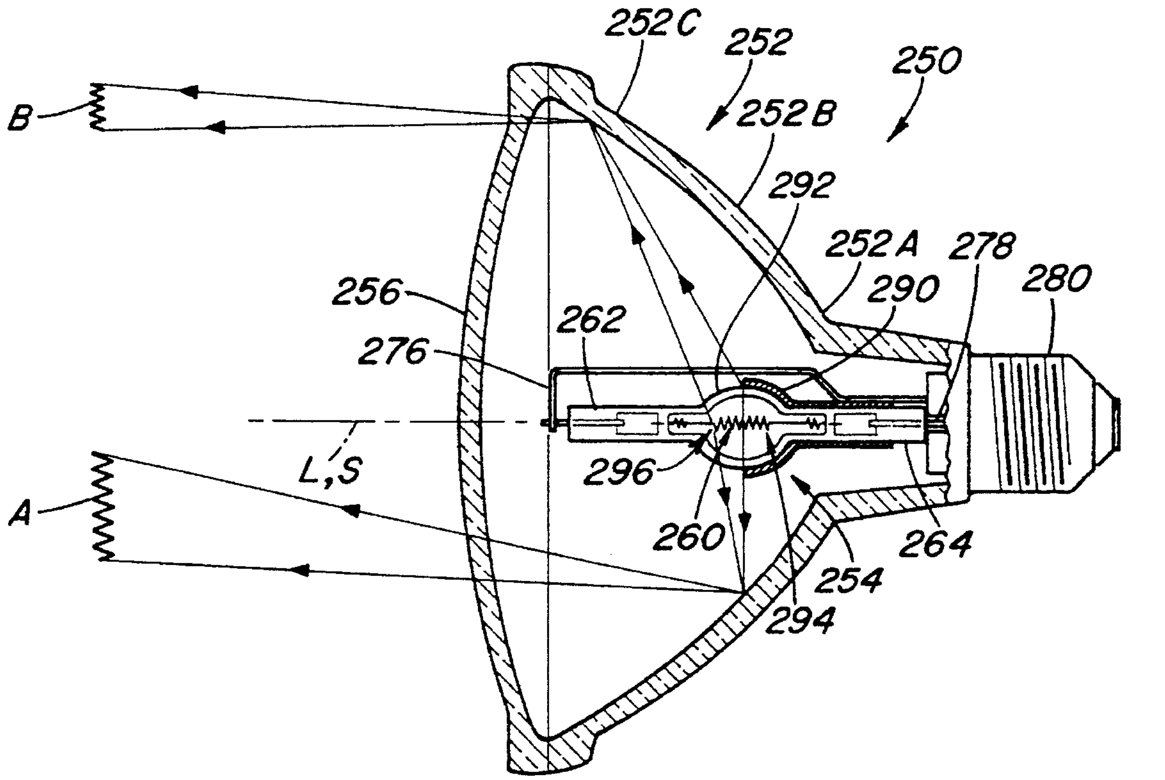
FIG. 14 is a side elevational view of a directional light system similar to that of FIG. 13, but having a reflective optical interference coating applied in a symmetrical pattern with respect to a longitudinal axis of the light source on approximately one-half of the exterior surface of the transparent envelope of the light source.
Figure 15:
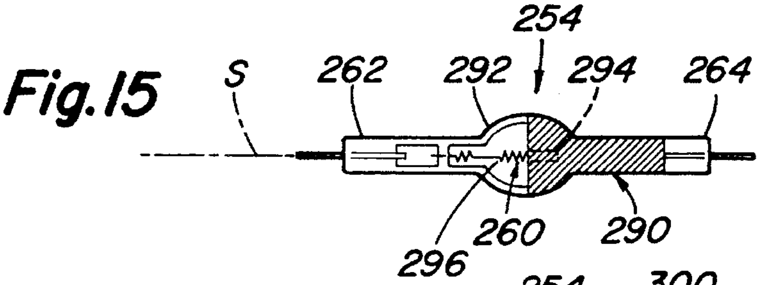
FIG. 15 is a side elevational view of the light source employed by the directional light system of FIG. 14 having the reflective coating on the exterior surface of the envelope in a predetermined pattern and with the light generating element extending substantially coaxial with the longitudinal axis of the light source.

Referring to FIGS. 14 and 15, there is illustrated one embodiment of the light source 254 improved in accordance with the principles of the present invention. Specifically, the light source incorporates one configuration of an optical interference filter in the form of a visible light reflective coating 290 partially covering an exterior surface 292 of the envelope. In this preferred arrangement, the reflective coating 290 is applied over approximately one-half of the exterior surface of the elliptical or bulbous portion 258 and the rearward or inner end portion 264 in a symmetrical pattern relative to the longitudinal axis S of the light source. The symmetrical pattern of the coating 290 is such that the coating shields a first or rearward axial part 294 (FIG. 15) of the active portion of the light generating filament 260 and leaves unshielded a second or forward axial part 290 thereof. The presence of the coating 290 in the above-described pattern allows the active length of the filament to emulate a filament of shorter length than it actually is, thereby yielding a light beam pattern smaller in angular distribution relative to the longitudinal axis S and larger in candlepower than would be the case in the absence of the coating 290.

The coating 290, by shielding the rearward axial part 294 of the filament active portion, blocks projection of light from base portions 252A of the reflector 252 and redirects the light to more desirable portions thereof. This can be understood by comparing the sizes of the projected filament images X and Y of FIG. 13 with projected filament images A and B of FIG. 14. This demonstrates that: (1) high magnification images X from the base portion 252A of the reflector, as seen in FIG. 13, are eliminated by the reflective coating 292 covering the rearward axial part 294 of the filament active portion in FIG. 14; (2) images A from the midsection 252B of the reflector in FIG. 14 have intermediate magnification but view only forward active part 296 of the filament active portion, thus producing shorter images than normal and images that are unusual in that one end originates at the middle of the filament active portion while the other end originates at the forward end of the forward axial part 296 as seen in FIG. 14; and (3) low magnification images from near the rim 252C of the reflector, namely images Y in FIG. 13 and B in FIG. 14 are unchanged except for increased intensity of image B caused by reflections from the coated half of the filament envelope, for example, the images B at 40° (see FIG. 18) are increased in intensity by about 50%.

Thus, the combination of the parabolic shape of the reflector 252 with the symmetrical pattern of the reflective coating 290 covering a rearward one-half of the exterior surface 292 of the envelope of the light source 254 improves the angular distribution pattern by providing a sharp beam cutoff, thereby enhancing the candlepower of the light beam produced by the light system 250. In a representative example, a tantala/silica multilayer visible reflecting coating was deposited over a portion of an envelope via LPCVD (Low Pressure Chemical Vapor Deposition) using borate masking for the coating pattern. This process will be described in greater detail below. A reduction in beam diameter of about 50% with increased uniformity of the central light spot and an increased brightness relative to uncoated envelopes was provided by the coating.

FIG. 18 is a graph plotting the intensity or candlepower of the light beam produced by coated and uncoated envelopes versus the angle of the beam relative to the longitudinal axis of the reflector. The chart in FIG. 19 shows the candlepower distribution around the light source 254 of FIG. 13 having the uncoated transparent envelope. In contrast, the chart of FIG. 20 shows the candlepower distribution around the light source of FIGS. 14 and 15 having the visible light reflective coating 290 over one-half of the transparent envelope. The improved distribution and increased candlepower of the light beam in FIG. 20 is readily apparent over that of FIG. 19.

Figure 16:
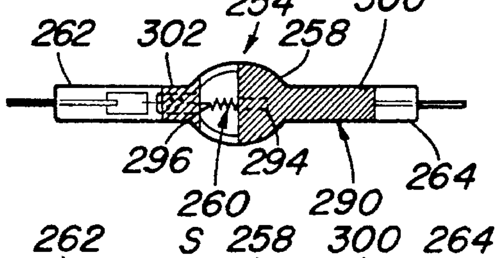
FIG. 16 is a view similar to that of FIG. 15, but showing the reflective coating applied in primary and secondary pattern portions.

Referring to FIG. 16, there is illustrated a modified embodiment of the light source 254 incorporating another configuration of an optical interference filter in the form of a visible light reflective coating 290. The coating has a primary portion 300 substantially in the same pattern as the coating described above with reference to FIGS. 14 and 15. Also, the reflective coating in FIG. 16 has a secondary portion 302 spaced from the primary portion 300 and applied on the exterior surface of a section of the forward or outer end 262 of the envelope where it attaches to the bulbous portion 258.

Figure 17:
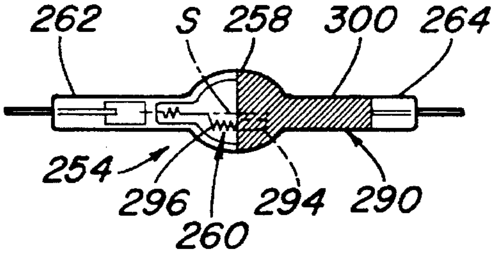
FIG. 17 is a view similar to that of FIG. 15, but showing the light generating element extending in an axially offset relation to the longitudinal axis of the envelope.

Referring to FIG. 17, there is illustrated another modified embodiment of the light source 254 incorporating the same coating pattern as in FIGS. 14 and 15. However, whereas the active portion of the filament 260 in FIGS. 14 and 15 extends coaxial with the longitudinal axis S of the light source 254, in FIG. 17 the active portion of the filament extends in an axially offset relation to the longitudinal axis S.

In all of the above-described embodiments, the light source is substantially coaxial or parallel to the axis of the reflector. As shown in FIGS. 21–27, the light system 350 positions the reflector axis L generally perpendicular to the light source axis S. Like elements are referenced by like numerals increased by three hundred (e.g., reflector 52 will be referenced as reflector 352) and new elements will be identified by new numerals. More particularly, and as illustrated in FIG. 21, the prior art system includes a reflector 352 and a light source 354 extending within the reflector. The reflector has a substantially parabolic shape and a longitudinal axis L. The light source 354 has a double-ended envelope substantially similar to the light sources described in the prior embodiments. The light source 354 is supported between a pair of upper and lower conductor members 376, 378 extending from a potted plug 380 mounted in an opening in the rear end of the reflector 352. The light source is supported by the conductor members so as to extend in a transverse, preferably substantially perpendicular, relationship to the longitudinal axis L of the reflector 352.

Figure 22:
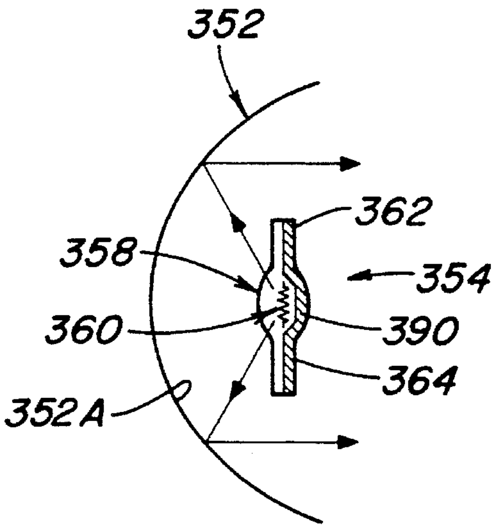
FIG. 22 is a diagrammatic side elevational view of a directional light system similar to that of FIG. 21, but having a visible light reflective optical interference coating applied on a first portion of an exterior surface of the transparent envelope of the light source.
Figure 24:
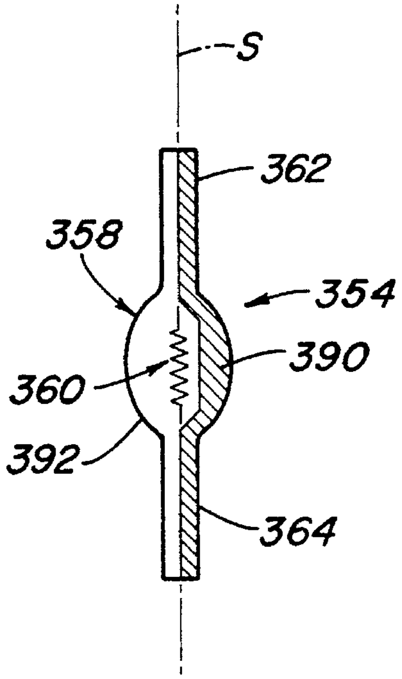
FIG. 24 is an enlarged diagrammatic side elevational view of the light source of FIG. 22, being shown by itself.

Referring to FIGS. 22 and 24, there is illustrated another embodiment of the light source 354 improved in accordance with the principles of the present invention by incorporation of one configuration of an optical interference filter in the form of a visible light interiorly-reflective coating 390. Preferably, the coating is applied on a first portion of an exterior surface of the transparent envelope of the light source. The visible light reflective coating 390 is approximately semi-cylindrical in profile and occupies approximately one-half the exterior surface area of the envelope. More particularly, the coating 390 is applied on the envelope exterior surface that faces away from the reflector 352. The first portion of the envelope exterior surface covers approximately one-half of the entire surface and lies along one of a pair of opposite sides of a plane defined along and through the longitudinal axis S of the light source. Therefore, the coating pattern is applied to the envelope in an asymmetrical relation to the longitudinal axis S.

It should be understood that in FIGS. 22–25, the coating 390 is shown as occupying approximately one-half of the exterior surface, however, this relationship is for the specific case wherein the filament 360 and the focal point of the parabolic reflector 352 lie at the edge of the reflector. For use with deeper reflectors, those having a greater curvature whereby its focal point is beyond the edge of the reflector, it has been found that the optimum coating pattern is less than one-half of the exterior surface, or approximately one-third of the exterior surface. Also, it should be understood that the above-described coating pattern is such that the remaining uncoated portion of the envelope exterior surface permits the active light generating portion of the filament to be seen at any point on the reflector.

The pattern of the coating 390 reflects the visible light emitted by the filament 360 away from the reflector 352 and redirects such light toward the active portion of the reflector. The coating acts as a light shield to eliminate direct forward light glare. The active light generating portion of the filament extends coaxially with the remainder of the filament 360 and the opposite ends 362, 364 of the envelope with respect to the axis S.

Figure 23:
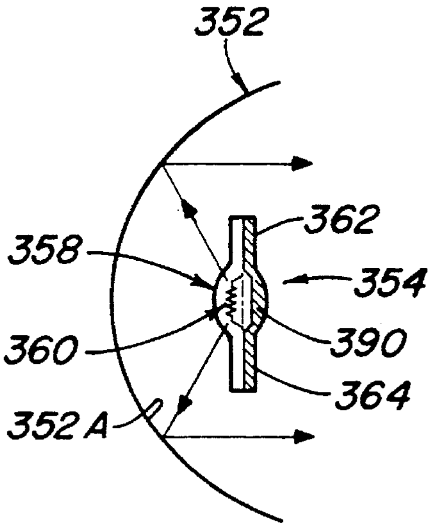
FIG. 23 is a diagrammatic side elevational view of a directional light system similar to that of FIG. 22, but having the active linear light generating element extending in an axially offset relation to the longitudinal axis of the transparent envelope.
Figure 25:
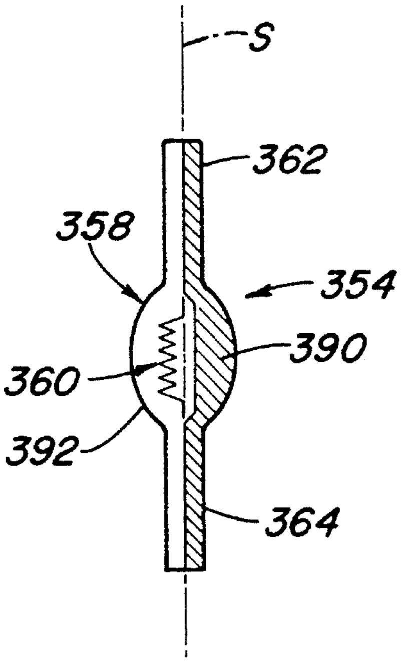
FIG. 25 is an enlarged diagrammatic side elevational view of the light source of FIG. 23, being shown by itself.

Referring to FIGS. 23 and 25, there is illustrated another embodiment of the light source 354. The only difference between the light source in FIGS. 23 and 25 and the light source in FIGS. 22 and 24 is that the active light generating portion of the filament 360 is axially offset but parallel to the remainder of the filament. In other words, the active light generating portion of the filament is offset and parallel to the opposite ends 362, 364 of the envelope with respect to the axis S.

Due to the transverse alignment maintained between the reflector 352 and the light source 354, and also due to the substantial mating of the shape of the reflective portion 352A of the reflector 352 with that of the pattern of the visible light reflective coating 390 on the envelope of the light source 354, the improved directional light system is capable of producing a light beam pattern having improved light collection efficiency and enhanced candlepower even though its miniature size is retained. Further enhancement of beam lumens is realized by offsetting the active light generating portion of the filament 360 from the longitudinal axis S of the light source 354. In a representative example, a tantala/silica multilayer visible reflecting coating was deposited over one-half of the envelope via LPCVD (Low Pressure Chemical Vapor Deposition) and resulted in a 50% increase in beam lumens with 50% higher maximum candlepower relative to uncoated envelopes.

Figure 26:
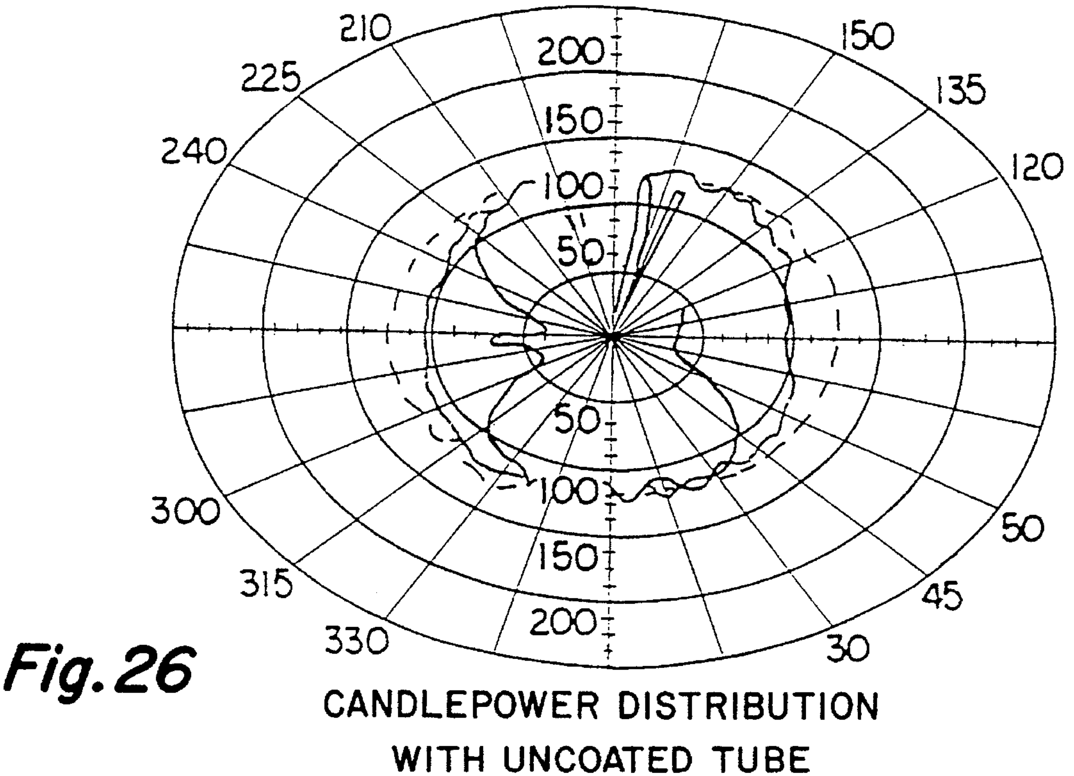
FIG. 26 is a chart of the candlepower distribution around a light source having the uncoated transparent envelope of FIG. 21.
Figure 27:
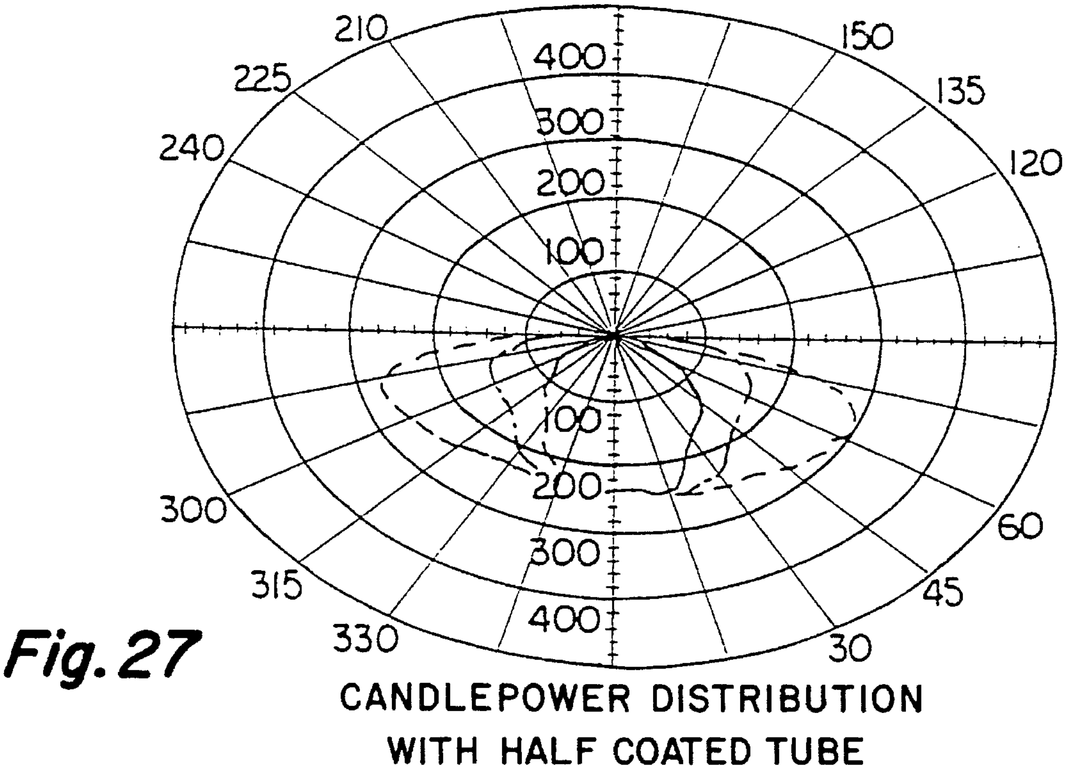
FIG. 27 is a chart of the candlepower distribution around a light source having the coated transparent envelope of FIG. 22.

The chart in FIG. 26 shows the candlepower distribution around the light source of prior art devices having an uncoated envelope as in FIG. 21. In contrast, the chart of FIG. 27 shows the candlepower distribution around the light source 354 of FIG. 22 having the visible light reflective coating 390 over one-half of the transparent envelope. The improved control and increased candlepower of the light beam in FIG. 27 is readily apparent over that of FIG. 26.

Figure 28:
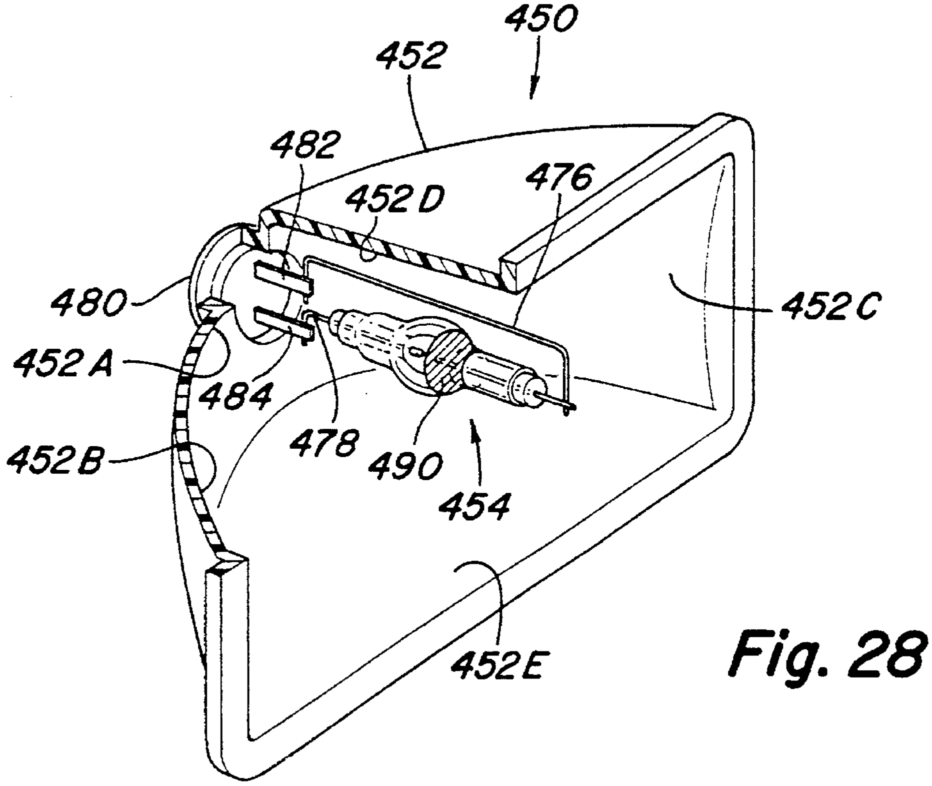
FIG. 28 is a perspective view of a reflector lamp that is partially cut away to show a light source that is selectively covered with a reflecting coating, in accordance with the invention.
Figure 29:
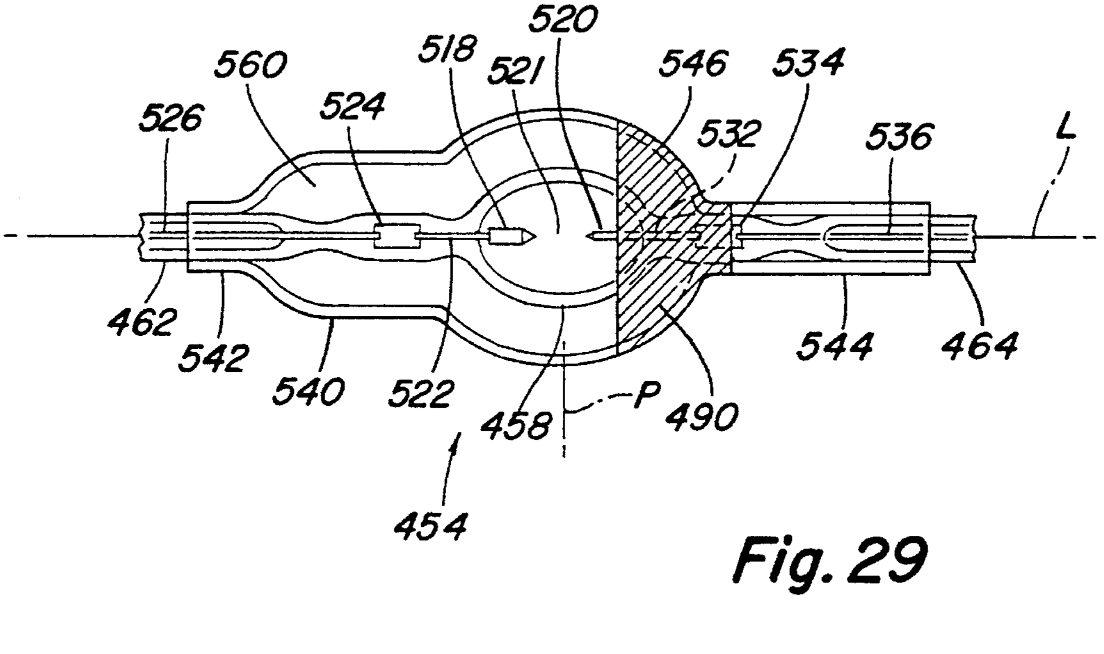
FIG. 29 is a simplified side view of a light source selectively covered with the mentioned coating, which can be used in the reflector lamp of FIG. 28.

Two related embodiments are illustrated in FIGS. 28–35. The similarities with previously described embodiments is apparent, e.g., FIGS. 2–7. These further embodiments demonstrate the applicability of features of this invention to light sources other than incandescent type light sources. As shown in FIGS. 28–31, an arc discharge lamp is shown in a truncated parabolic reflector. More particularly, FIG. 28 shows an arc discharge lamp 454 situated within a reflector 452. The lamp is held in place by metal connectors 476, 478 that depend, respectively, from conductors 482, 484 mounted on a potted end 480. The reflector comprises a substantially parabolic, primary reflecting surface 452A, and upper and lower planar surfaces 452D and 452E, respectively. Planar surfaces 452D and 452E limit, or truncate, the vertical extent of parabolic reflecting surface and are thus also referred to as planar "truncating" reflecting surfaces. As discussed above, the planar truncating surfaces play a far less active role than the primary reflecting surface 452A in reflecting light forwardly from the lamp.

The arc discharge light source is preferably of the metal halide type. It includes a refractory light-transmissive envelope comprising longitudinal ends 462 and 464, and an intermediate bulbous region 458 containing a sealed chamber. Electrodes 518 and 520 are spaced apart from each other by an arc gap 521 in the chamber which also includes a gaseous fill that typically includes a metal halide. The electrodes are approximately aligned with the longitudinal axis L of the light source, at least in the vicinity of bulbous region 458. Preferably, such longitudinal axis L, in turn, is substantially aligned with a longitudinal axis (not shown) of the parabolic reflecting surface 452. In conventional manner, electrode 518 is connected by a lead 522 and refractory foil 524 to an inlead 526. Similarly, electrode 520 is connected by a lead 532 and refractory metal foil 534 to an inlead 536. Although not shown, leads 522, 532 are typically wrapped, in conventional manner, with respective coils of wire to facilitate alignment of such leads along longitudinal axis L.

In the example shown, an outer arc tube envelope 540 of light-transmissive refractory material is formed over the light-transmissive envelope and comprises ends 542, 544 spaced from each other along longitudinal axis L, and an intermediate bulbous region 546. The ends of the outer envelope are respectively attached to ends 462, 464 of the envelope by melting and fusing together the adjacent envelope and outer envelope ends. If desired, space 460 between the envelope and the outer envelope can be placed under vacuum, as taught, for instance, in U.S. Pat. No. 4,935,668 issued to Richard L. Hansler, et al. and assigned to the instant assignee. Further, the outer envelope can be mounted in relation to the envelope with other geometries (not shown), such as by fusing the outer envelope ends 542, 544 directly to the inleads 526, 536, respectively. The foregoing method of attachment is also taught in the foregoing '668 patent.

Substantially all of the outer envelope bulbous region to the right of plane P is coated with a visible light-reflecting coating 490. Coating 490 reflects light emitted by the arc discharge back towards the arc discharge. For this purpose, outer envelope bulbous region 546 has a substantially elliptical or spherical shape along longitudinal axis L. As a result, the light directed to parabolic reflecting surface 452A of the light source can be effectively controlled by the reflecting surface to achieve a desired beam pattern.

Figure 30:
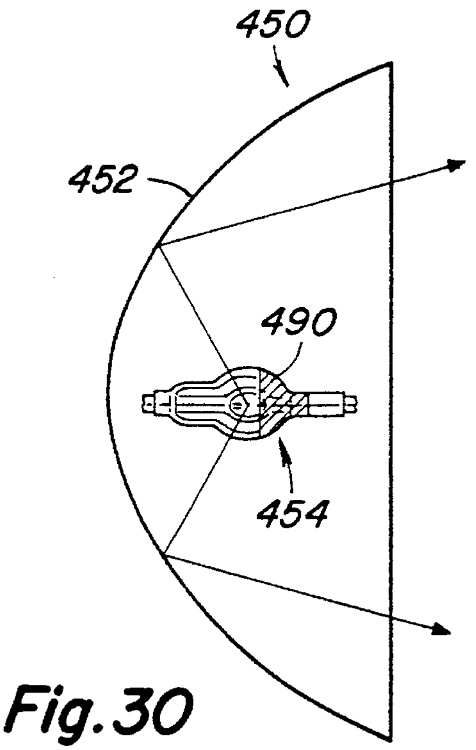
FIGS. 30 and 31 are diagrammatic top and side plan views, respectively, of the reflector lamp of FIG. 28 for showing light rays emanating from portions of the light source of FIG. 29 that lack the mentioned coating.
Figure 31:
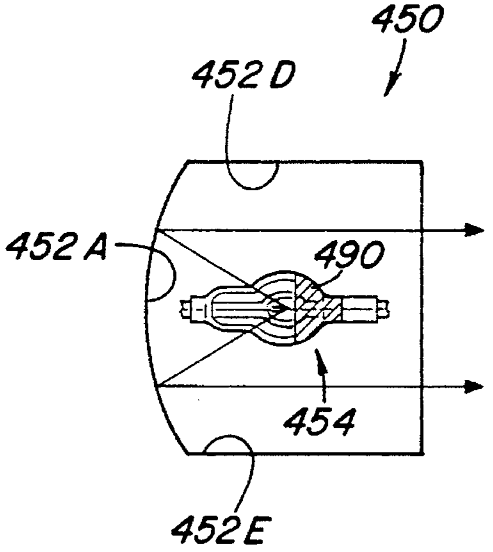
Figure 32:
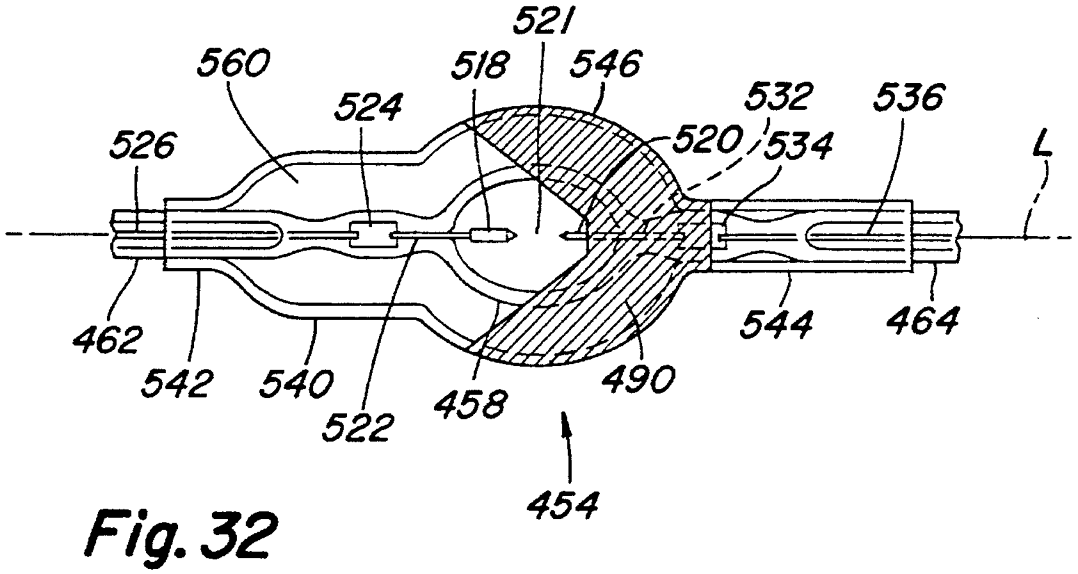

Visible-light reflecting coating 490 is positioned on light source 454 as shown in FIG. 28, and also in the simplified top and side plan views of lamp shown in FIGS. 30 and 31, respectively. In FIG. 30, light rays comprise two components. The primary reflecting surface 452A receives a first component in a non-reflected condition, and a second component that has been reflected from coating 490 and redirected towards the arc discharge in arc gap 521. Because the discharge is largely transparent to its own radiated light, the second component of light largely passes through the discharge to reach the primary reflecting surface. The primary reflecting surface 452A then directs the cumulative first and second components of light forwardly as light rays. The side plan view of FIG. 31 similarly shows light rays following the mentioned pattern of light rays of FIG. 30, and being reflected by reflecting surface 452A in a forward direction.

If the parabolic reflecting surface collects, for instance, about one third of the light reflected by coating 490, with an apparent position coinciding with the arc discharge, the beam lumens can be theoretically increased by about 20% to 30%. Visible light-reflecting coating 490 may, for instance, comprise twenty-seven alternating layers of tantala and silica deposited on the envelope by LPCVD (Low Pressure Chemical Vapor Deposition), using borate masking to achieve the pattern shown and to be described in greater detail below.

The foregoing coating is refractory, and thus able to withstand the high temperatures encountered during operation of the light source. In contrast, a conventional metal coating (e.g., aluminum or silver) would fail under such operating temperatures. The described coating, moreover, forms an optical interference filter, which is specular, or mirror-like, and which considerably aids in reflecting light rays towards longitudinal axis L of the light source. On the other hand, diffuse coatings that reflect visible light, formed of powdered material such as alumina, are far less capable of reflecting light towards longitudinal axis L. Accordingly, diffuse coatings increase the apparent size of the light source as "seen" by the parabolic reflecting surface, resulting in a less-controlled beam, typically with glare. The foregoing, distinguishing features of the described coating 490 preferably apply to all other visible light-reflecting coatings referred to herein.

Another desirable property of an optical interference filter is that it can be designed to selectively transmit, or to reflect, light in different frequency ranges. Thus, when formed of an optical interference filter, coating 490 can be designed to reflect infrared light, or to transmit an undesirable color of visible light, for instance. This is accomplished by selecting layer thicknesses and layer count for a given set of high and low index of refraction materials.

Yet another advantage offered by the optical interference filter is improved color mixing. With conventional arc lamps, color separation can occur. The addition of the reflective coating directing portions of the emitted radiation through the essentially transparent source provides color mixing.

In addition to increasing beam lumens, visible light-reflecting coating 490 on the light source of the foregoing FIGS. 28–31 also serves as a light shield to prevent direct forward-going light from the light source from being projected forwardly. Such direct forward-going light lacks the high degree of directional control gained from being reflected by parabolic reflecting surface 452A. In an automobile headlamp, for instance, an oncoming driver observing the headlamp is protected from the glare caused by such uncontrolled light.

FIGS. 32–35 show another light source of the arc discharge type. With the exception of the configuration of visible light-reflecting coating 490 on the light source of FIG. 32, the other parts of such light source conform to the above description of the like-numbered parts.

Visible light-reflecting coating 490 on the light source defines a clamshell pattern (FIGS. 32 and 33) in a manner similar to the embodiments of FIGS. 2–7. The clamshell pattern is preferably configured such that an arc in the arc gap can be "seen" from any point on the primary reflecting surface 452A, but, to the extent possible, not from any point on planar truncating surfaces 452D and 452E. Owing to the preferably spherical or elliptical shape of that portion of outer envelope bulbous region covered with coating 490, light from an arc in the arc gap received by, and reflecting from, the coating is focussed back through the arc. As a result, the light directed to parabolic reflecting surface 452A can be most effectively controlled by such parabolic reflecting surface to achieve a desired beam pattern.

FIGS. 34 and 35 respectively show simplified top and side plan views of the light system having the described clamshell pattern. The illustrated light rays show that the upper and lower sides of the clamshell pattern (see FIG. 32) substantially prevent light rays from the light source from reaching planar truncating reflecting surfaces 452D and 452E. Light rays reaching these surfaces are nearly useless, since such surfaces fail to reflect light in the forward direction. The clamshell pattern of coating instead receives light that would otherwise uselessly reach planar truncating surfaces and redirects it, as shown by the light rays, rearwardly to the parabolic, primary reflecting surface. The primary reflecting surface then reflects the light in a useful forward direction. Of course, the illustrated light rays also have a component of light that is received by reflecting surface directly from the arc discharge.

Additionally, the clamshell pattern of visible light-reflecting coating 490 of light source blocks non-reflected light from the arc discharge from being directly sent in a forward direction. Such direct forward-going light, avoided by the clamshell pattern, would add a component to the forward light beam that lacks the high degree of directional control gained from being reflected by parabolic reflecting surface.

An increase in beam lumens in excess of 20% is expected for the clamshell coating pattern compared with uncoated light sources. For such purposes, visible light-reflecting coating 490 may be formed by depositing alternating layers of tantala and silica on the envelope by LPCVD, using borate masking to achieve the pattern shown.

Figure 36:
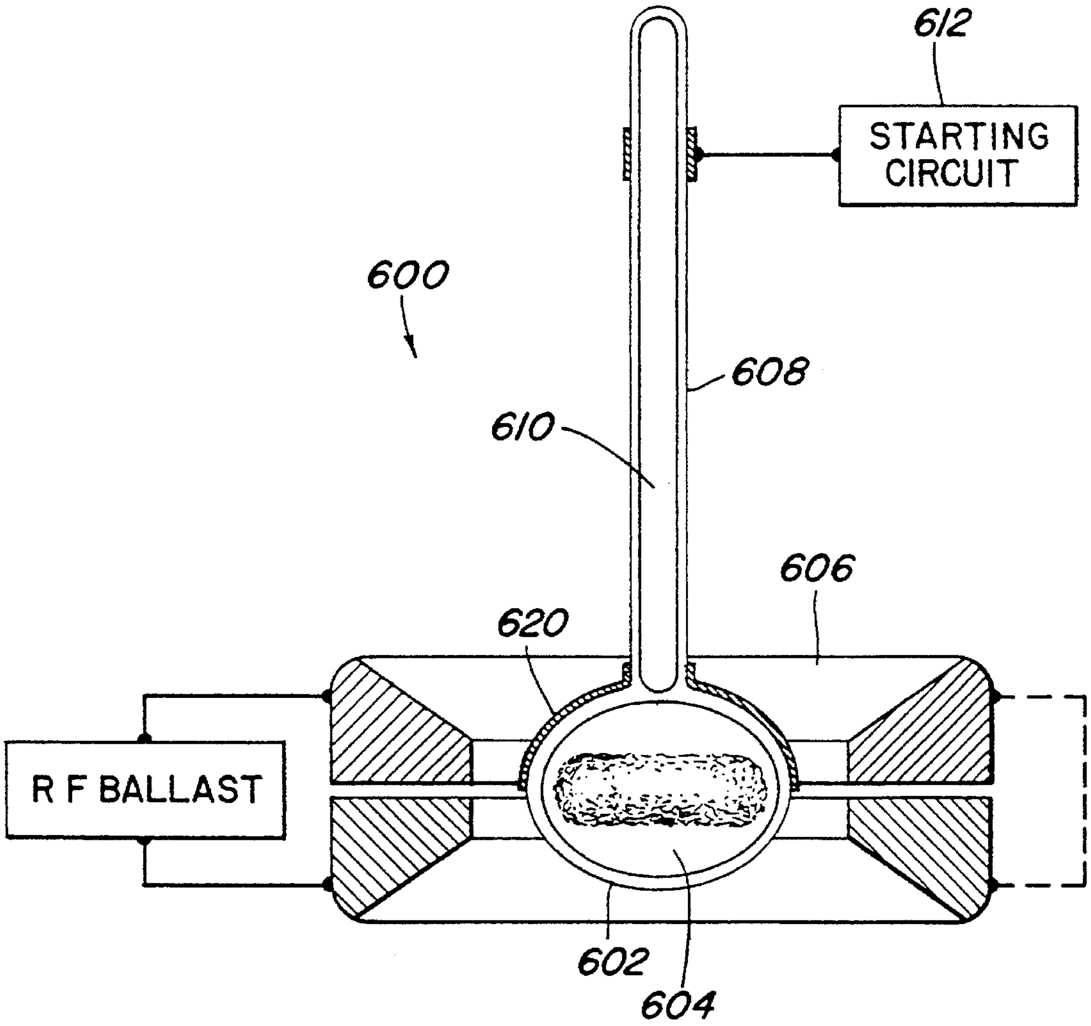
FIG. 36 is an elevational view partly in cross-section illustrating a high pressure electrodeless lamp having a coating on a portion of the envelope in accordance with this invention.

FIG. 36 represents yet another type of lighting system or lamp to which the principles of the subject invention apply. As shown, an electrodeless high intensity discharge lamp 600 has an arc tube 602 that contains a fill of ionizable gas 604. A high frequency RF signal is supplied by an excitation coil 606 to excite the ionizable gas to a gas discharge state. A starting aid 608 is associated with the arc tube and usually constructed from a similar fused quartz material. A low pressure gas or gas mixture 610 has a lower dielectric breakdown value than the gas fill 604 so that it achieves a state of electric discharge initiated by starting circuit 612. Once the gas 610 has reached a state of electric discharge, it serves to initiate the electric discharge within the arc tube 602. In this manner, visible radiation is emitted from the lamp. Particular details of this type of electrodeless lamp are well known in the art so that further discussion herein is unnecessary.

In accordance with the subject invention, portions of the arc tube 602 and/or the starting aid 608 can be provided with an optical interference filter or coating 620. Selected portions of the emitted radiation are reflected back toward the arc discharge, at least a portion of which is converted to visible light radiation and an overall increase in efficiency. Moreover, coating selected portions of the light source permits a designer to project the light in predetermined orientations and patterns.

In order to obtain such patterned interference filters, the envelope is first masked with a solid masking material which is able to undergo viscous flow under stress at a temperature broadly ranging between 250°–700° C. and which is soluble in a medium which will not adversely affect either the filter material or the envelope. The mask is applied to the envelope in a pattern which, when removed from the envelope after deposition of the filter, leaves the filter on the substrate in the desired pattern. The multilayer optical interference filter is applied to the masked envelope by any suitable means known to those skilled in the art.

In one embodiment of the invention, a precursor of a masking material, such as a boric oxide precursor, is applied to an external surface of the light source envelope. The precursor is then converted to boric oxide prior to deposition of the multilayer filter or coating. In another embodiment, the boric oxide material or a precursor thereof is applied to the envelope via a chemical vapor deposition process. With a vapor deposition, evaporation or sputtering masking process, the envelope must first be premasked or coated with a suitable material, such as decals, tape, organic coating compounds such as lacquers, etc., and the boric oxide precursor applied over the premasked envelope. The decal, tape or lacquer premask is applied to the envelope in the pattern in which the patterned interference filter is desired and the boric oxide or boric oxide precursor applied over the premasked envelope.

Alternatively, the premask may be achieved by use of a mechanical mask or stencil combined with spraying the boric oxide precursor onto the envelope. A mechanical premask will also work well with line-of-sight processes, such as evaporation, sputtering or other physical vapor deposition (PVD) methods for applying the boric oxide or precursor thereof. Boric oxide, or a boric oxide precursor, can also be applied by spraying, dipping or daubing an aqueous slurry of either of these materials in a saturated solution of same with the viscosity adjusted by using a suitable viscosifier such as methyl cellulose or acrylic acid which can later be burned out leaving the boric acid.

After deposition for formation of the boric oxide or boric oxide precursor, the premask is dissolved off the envelope in a liquid or vapor media which does not dissolve or adversely affect either the boric oxide, boric oxide precursor or envelope. Alternatively, some premasking compounds, such as a lacquer, may be removed in-situ via pyrolysis during conversion of the boric oxide precursor to the boric oxide. In some embodiments, a premask is not needed and the envelope is either partially immersed in a liquid boric oxide precursor or the precursor is brushed, painted or daubed onto the envelope such that the desired pattern for the optical interference filter (which will be applied over the masked envelope) is achieved after removal of the boric oxide.

Tributyl borate and trimethoxyboroxine are liquid boric oxide precursors that have been found to be useful in the practice of the invention and have been applied to substrates such as envelopes by dip coating, painting, brushing and daubing. By way of example, a lamp, such as an incandescent lamp having a fused quartz or glass lamp envelope, is dipped in, brushed, painted or daubed with the viscous, liquid tributyl borate or trimethoxyboroxine only on those portions of the envelope surface where the optical interference filter is not desired. Excess tributyl borate liquid on the lamp envelope is removed by using a fibrous material such as a capillary wicking device. The lamp envelope to which the tributyl borate (or trimethoxyboroxine) has been applied is then contacted with water, steam or a high humidity environment (such as by placing the coated lamp envelope over boiling water) to convert the precursor liquid to boric acid. The tributyl borate or trimethoxyboroxine reacts with $H_2O$ to form boric acid ($H_3BO_3$). This produces a frosty appearing, solid boric acid on the envelope where the liquid tributyl borate precursor was present.

The so-formed boric acid is somewhat porous, has pinholes and is easily damaged or marred by handling. Consequently, it must be densified and converted to boric oxide ($B_2O_3$) to be useful in the practice of the invention. This is readily accomplished by heating to a suitable elevated temperature typically in the range of from 550° C.–800° C. to convert the boric acid to boric oxide. The elevated temperature also removes any residual organic material present and promotes good adhesion between the boric oxide coating and the vitreous substrate. Heating in air for five to ten minutes at 650° C. has worked well in the laboratory.

The boric oxide is a glassy material which exhibits viscous flow at temperatures of 250° C. and higher (i.e., 250°–700° C.) which is a beneficial and important feature in the practice of the process of the invention. The viscous flow eliminates defects, such as pinholes, in the mask. It also serves to relieve the intrinsic stress that occurs during vapor deposition processes when applying the filter over the masked envelope. If this stress is not relieved, the mask may spall during formation of the filter which means that the filter will also be applied to the envelope where spalling has occurred. This, of course, is undesirable.

This intrinsic stress is that which is inherent from the deposition process and is not the same as that which would occur from differential thermal expansion and contraction. When applying optical interference filters made of refractory metal oxides, the slight viscous flow of the boric oxide mask results in cracking of the overlying interference filter material which aids in the subsequent removal of the mask and overlying filter. The non-crystalline, glassy nature of the boric oxide also adds to less film defects in the mask, because no tensile stresses are produced in the mask due to morphological phase changes which would occur with a crystalline material. Therefore, in order to be useful as a mask with optical interference filter deposition processes which occur at elevated temperatures, such as chemical vapor deposition processes (CVD), the masking material should preferably exhibit viscous flow in order to relieve stress and avoid spalling and cracking of the mask during the filter deposition process.

In general, the boric oxide mask may broadly range between about 0.1 to 2 microns in thickness, with 0.5 to 0.7 microns being preferred. Too thick a coating can cause failure in a glass or fused quartz envelope due to the thermal expansion mismatch between the boric oxide in its solid state and the silica envelope. If it is too thin, pinholes may result and the mask may be more difficult to remove.

In order to achieve a boric oxide mask thickness on the order of one micron or more, more than one application of the tributyl borate precursor followed by hydrolysis to boric acid may be necessary. Using trimethoxyboroxine has resulted in a one micron thick mask using only one dip. In the case of dip coating, an outer envelope surface of a lamp, or the filament or arc chamber of a light source is dipped into liquid tributyl borate at room temperature. With tributyl borate, it was found that one dip resulted in a densified boric oxide film only one-half micron thick after hydrolysis and conversion to the oxide. Repeating the process produced a boric oxide thickness around one micron.

The boric oxide mask precursor, i.e., boric acid, has also been produced by an Atmospheric Pressure Chemical Vapor Deposition (APCVD) process by reacting trimethyl borate vapor with water vapor at room temperature in a reaction chamber containing the object or envelope to be masked. In this process, a stream of nitrogen gas is bubbled through liquid trimethyl borate and another stream of nitrogen gas is bubbled through water vapor with the two streams separately fed into a reaction chamber containing the lamp or other object to be masked. The trimethyl borate vapor reacts with the water vapor which forms a boric acid ($H_3BO_3$) coating on the envelope which is then heated to form the boric oxide. A one (1) micron thick coating of boric oxide is readily achievable using this process. As with the liquid metallo organic precursor process, the so-formed boric acid must be heat treated to densify it and to convert it to boric oxide and a temperature of about 650° C. for five to ten minutes as disclosed above has been found to be suitable.

In the APCVD process, complex symmetric and asymmetric boric oxide mask patterns have been achieved by using various premask materials such as decals and adhesive tape. After the boric acid has been formed, the decal or tape is removed and the boric acid remaining on the coated envelope is converted to boric oxide by heating.

After the boric oxide coating has been formed, the desired multilayer optical interference filter is applied to the boric oxide masked envelope. This may be done using any well known deposition process presently employed for applying such filters including, for example, vacuum evaporation, ion plating, sputtering, Chemical Vapor Deposition (CVD) processes such as plasma CVD, Atmospheric Pressure CVD (APCVD) and Lower Pressure CVD (LPCVD).

In practicing the process of this invention, refractory metal oxide multilayer optical interference filters made of alternating layers of titania and silica and also of tantala and silica for a total of from twenty-six to thirty-two layers have been applied to the outer surface of the filament and arc chambers of electric lamps at a temperature within the range of 350°–600° C. using an LPCVD process. This portion of the process is disclosed in U.S. Pat. Nos. 4,949,005 and 5,138,219 assigned to the assignee of the present invention, the disclosures of which are incorporated herein by reference. The '005 patent also discloses annealing filters of tantala and silica at a temperature between 550°–675° C.

In summary, prior to applying the optical interference filter, those portions of the outer surface of the lamp envelope shown as not coated are premasked with a decal. The premasked lamp is then dipped in tributyl borate, withdrawn, and excess tributyl borate removed by wicking with a paper towel. The tributyl borate-coated lamp is held over boiling water to hydrolyze the borate to boric acid and then placed in a 650° C. oven for ten minutes to convert the boric acid to boric oxide. This process may be repeated a second time.

The cold mirror described above is then applied over the boric oxide masked lamp using an LPCVD process at a temperature in the range of 350°–600° C. After the filter is formed over the masked lamp, the lamp is cooled and placed in water which dissolves the boric oxide, removing it and the filter material applied over it. The lamp is then heat-treated to anneal the remaining cold mirror patterned optical interference filter following the annealing schedule in the '005 patent.

The invention has been described with reference to the preferred embodiments and methods of forming same. Obviously, modifications and alterations will occur to others upon a reading and understanding of this specification. It is intended to include all such modifications and alterations insofar as they come within the scope of the appended claims or the equivalents thereof.

What we claim as new and desire to secure by Letters Patent of the United States is:

1. A light source comprising:

means for generating light;

a vitreous light-transmitting envelope having a sealed chamber that receives the light generating means and an external surface, the envelope and light generating means being dimensioned such that the average power density transmitted through the envelope is at least four (4) watts/cm$^2$; and a multilayer optical interference coating on only a portion of the external surface of the envelope for reflecting light from the light generating means in a direction that enhances the amount of light transmitted through an uncoated portion of the envelope external surface.

2. A light source for use in an optical system having a reflector that receives light from the light source and directs the light in a desired manner, the light source comprising:

means for generating light;

a vitreous light-transmitting envelope having a sealed chamber receiving the light generating means and having an external surface, the envelope and light generating means being dimensioned such that the average power density transmitted through the envelope is at least four (4) watts/cm$^2$; and a multilayer optical interference coating on only a portion of the external surface of the envelope for reflecting light from the light generating means in a direction for maximizing light out of the reflector.

3. The light source as defined in claim 2 wherein the envelope has a longitudinal axis and the optical interference coating is symmetrically arranged relative to the longitudinal axis and on the external surface of the envelope.

4. The light source as defined in claim 3 wherein the optical interference coating has a primary portion covering at least one-fourth of the envelope.

5. The light source as defined in claim 4 wherein the optical interference coating has a secondary portion axially spaced from the primary portion.

6. The light source as defined in claim 3 wherein the light generating means is substantially coaxial with the longitudinal axis of the envelope.

7. The light source as defined in claim 3 wherein the light generating means is parallel to and offset from the longitudinal axis of the envelope so that a greater portion of the light is able to reach the reflector without significant loss of control of the light beam pattern.

8. The light source as defined in claim 2 wherein the envelope has a longitudinal axis and the optical interference coating is asymmetrically arranged relative to the longitudinal axis on the external surface of the envelope.

9. The light source as defined in claim 8 wherein the optical interference coating covers approximately one-third to one-half of the external surface.

10. The light source as defined in claim 9 wherein the optical interference coating lies along one side of a plane defined along and through the longitudinal axis.

11. The light source as defined in claim 2 wherein the light generating means includes a filament.

12. The light source as defined in claim 2 wherein the light generating means includes first and second electrodes spaced apart in the envelope for forming an arc therebetween.

13. The light source as defined in claim 2 wherein the light generating means is an electrodeless discharge arrangement.

14. A light system comprising:

a light source having an envelope enclosing a sealed chamber and a light generating means disposed along a first longitudinal axis such that the temperature of at least a portion of the envelope is greater than 400° C.;

a reflector having an active portion disposed relative to the light source to receive light therefrom and direct the light in a desired direction; and a multilayer optical interference reflective coating disposed on only a portion of an external surface of the envelope in a configuration such that the light is reflected toward the active portion of the reflector.

15. The light system as defined in claim 14 wherein the active portion of the reflector has one of a parabolic, elliptical and non-imaging configuration.

16. The light system as defined in claim 14 wherein the first longitudinal axis of the light generating means is substantially coaxial with a central axis of the reflector.

17. The light system as defined in claim 14 wherein the first longitudinal axis of the light generating means is substantially perpendicular to a central axis of the reflector.

18. The light system as defined in claim 14 wherein the coating is symmetrically disposed on the external surface of the envelope.

19. The light system as defined in claim 14 wherein the coating is asymmetrically disposed on the external surface of the envelope.

20. The light system as defined in claim 14 wherein the light generating means is a filament parallel to and offset from a second longitudinal axis of the envelope to increase the amount of light reflected by the coating that reaches the active portion of the reflector.

21. The light system as defined in claim 14 wherein the light generating means includes a filament.

22. The light system as defined in claim 14 wherein the light generating means includes first and second electrodes spaced apart in the envelope for forming an arc therebetween.

23. The light system as defined in claim 14 wherein the light generating means is an electrodeless discharge arrangement.

24. A light source comprising:

an envelope having a sealed chamber and an external surface, the envelope being dimensioned such that the average power density transmitted through the envelope is at least four (4) watts/$cm^2$;

means for generating light from within the chamber; and an optical interference coating formed on the envelope external surface by forming a boric oxide mask on a portion of the external surface, applying the coating on the external surface, and removing the boric oxide mask and the light reflecting coating applied thereover to define a patterned optical interference filter.

* * * * *